Patented Aug. 23, 1927.

1,640,221

UNITED STATES PATENT OFFICE.

SAMUEL SHAFER, JR., OF MILWAUKEE, WISCONSIN, ASSIGNOR TO CHAIN BELT COMPANY, OF MILWAUKEE, WISCONSIN, A CORPORATION OF WISCONSIN.

LOADING SKIP FOR CONCRETE MIXERS.

Application filed May 13, 1926. Serial No. 108,957.

It is customary in the building of concrete roads to charge the concrete paving mixer machine that is used with measured batches of concrete aggregate. These batches are commonly conveyed to the mixing machine in batch boxes, each holding a single measured batch of aggregate, which are transported by trucks or on industrial railway cars from the measuring plant, where the sand and stone to be used in the road construction are stored in bulk, and where frequently the cement is also stored. However, it is sometimes found desirable to stock the cement to be used in conveniently placed piles along the course of the work, and to dump into the loading skip of the mixing machine after each batch of coarse aggregate of sand and stone has been charged into the same, as much cement as is required, taken from one of such piles. This latter procedure is followed where there is so much moisture in the coarse aggregate as to cause the cement, if placed in the batch box at the measuring plant, to take an initial set before it is delivered to and treated in the mixing machine. This is also desirable where, due to high winds, there is the liability of considerable loss of cement while being transported with the coarse aggregate. When the cement is charged into the power loading skip separately from the coarse aggregate I have found that it is very desirable to have a separate receptacle for holding the cement and maintaining it apart and separate from the coarse aggregate until the moment of discharging the skip into the mixer, because when the cement is dumped directly into the skip with the coarse aggregate, or upon the top of the latter after it has been discharged into the skip, more or less of the cement sticks to the sides of the skip, particularly when the coarse aggregate is very damp, thus entailing additional labor to keep the skip clean and the inner walls thereof smooth, so that the charge will slide freely into the mixer when the skip is elevated. By the use of a separate receptacle for the cement the latter can be charged while waiting for the movement of the coarse aggregate to the loading skip, thus saving time, it being understood that the delivery of the cement to the charging skip is usually by hand.

My invention has for its object to improve the construction of the loading skip for concrete mixing machines, by providing the same with a separate receptacle, compartment, or container for the charge of cement, which may be easily charged and wherein it may be maintained entirely separate from the coarse aggregate until the moment the full charge is delivered to the mixing machine.

While my invention is particularly useful in connection with the loading skip for concrete paving machines it will be readily seen that it may be used in connection with concrete mixers of other types.

In the accompanying drawings—

Figure 1 is a side view of a power-operated loading or charging skip for a concrete mixing machine provided with my invention.

Fig. 2 is a plan view of the same.

Fig. 3 is a rear or end view.

Referring to the drawings, 1 designates a loading skip of well known construction. It is arranged to be pivotally connected, as at 2, to the frame of a concrete mixer in connection with which it is used. 3 indicates one of the cables by which the skip is operated in a well known manner.

The skip is formed with a spout section 4, through which the aggregate of solid material which enters into the formation of a batch of concrete is delivered to the rotating drum of the paver or other mixing machine, and with an unobstructed open section 18 having sides flaring toward the rear, into which the entire charge of coarse aggregate for a particular batch may be delivered at one time and operation, from batch boxes, trucks, or otherwise. When the skip is in its lowered position, as represented in Fig. 1, the section 18 rests upon the ground to facilitate its being loaded.

Patented Aug. 23, 1927.

1,640,222

UNITED STATES PATENT OFFICE.

ALBERT SLOWIK, OF CHICAGO, ILLINOIS.

VEHICLE BUMPER.

Application filed April 28, 1927. Serial No. 185,945.

The present invention relates to vehicle bumpers and its main object is the provision of a bumper of such construction which would facilitate the absorption of the jar at the impact of the bumper.

Another object of the invention is the provision of means in a bumper whereby said bumper may flex or yield gradually in progression to the impact.

Another object of the present invention is the provision of a bumper of the character indicated which may be simple in construction.

With the above general objects in view and others that will appear as the nature of the invention is better understood, the same consists in the novel construction, combination and arrangement of parts hereinafter more fully described, illustrated in the accompanying drawing and pointed out in the appended claims.

In the drawing forming a part of this application, and in which like designating characters refer to corresponding parts throughout the several views, Fig. 1 is the top elevational view of the bumper in its inoperative condition;

Fig. 2 is a top elevational view of the bumper while the same is partially flexed;

Fig. 3 is a front view of the bumper;

Fig. 4 is a cross-sectional view through line 4—4 of Fig. 1; and

Fig. 5 is a cross-sectional view on line 5—5 of Fig. 1.

The bumper contemplated by the present invention includes a front bumper bar 10 of the usual construction. Spaced on a horizontal plane and rearwardly of said bar 10 is another bar 11, to which brackets, not shown, or other means may be attached by means of which the entire bumper may be mounted upon the vehicle.

Adjacent each end of said bar 10 there are mounted thereupon a pair of plates 12 extending rearwardly of said bar and are horizontally disposed. The front ends of said plates 12 are T-shaped so as to provide means for mounting said plates upon the front bar through the medium of bolts or rivets 13 as shown on Fig. 5.

The bumper further embodies three rods 14, the two end rods being positioned at the ends of the bumper and outwardly of said plates 12, while the third rod runs centrally of the bumper. Each of said rods is of like construction and is threaded at both of its ends as clearly shown on Fig. 4. The bumper bar 10 is provided with suitable apertures 15 for passing said rods therethrough, and adjacent each bore the bar is further provided with pockets 16 wherein nuts 17 upon the forward ends of said rods 14 are positioned and countersunk. Each of said rods is adapted to receive pipes 18, which by their front ends are in abutment with the inner face of bumper bar 10, and pipe 18 on the central rod is adapted to abut the inner face of plate 19 which is mounted upon the central portion of bumper bar 10 for strengthening the same. The inner ends of said pipes 18 pass through apertures 20 made in the rear bumper plate 11. The rear ends of said rods 14 receive nuts 21 each of which is of greater diameter than apertures 20 so that said nuts act as means for limiting forward movement of each of said rods 14 as will be hereinafter apparent. Also said nuts 21 hold the respective pipes 18 in stationary position in respect of each rod 14 and in abutment with the rear faces of bar 10 and plate 19, as the case may be.

The invention further embodies central bar 22 which is positioned between bars 10 and 11 and remains in spaced relation therewith when the bumper is in its inoperative condition illustrated on Fig. 1. Said bar 22 is shorter than either bar 10 or 11 and does not reach to or pass the outermost two rods 14 as clearly seen on Figs. 1 and 2. Said central bar 22 at a point centrally thereof has an aperture 23 through which the central rod 14 with its pipe 18 passes and upon which said central bar is positioned and adapted for sliding movement thereupon and longitudinally thereof. For further supporting said central bar 22 plates 12 pass through said bar 22 upon which plates said bar is likewise adapted for sliding movement.

Cooperating with bar 22 and bar 11 are two shorter rods 14' with their cooperating pipes 18' of like construction and arrangement as rods 14 and pipes 18, each of said rods 14' and pipes 18' being positioned on each side of the central rod 14 at substantially the central portions of said bar 22 and bar 11 and intermediately of said central rod 14 and two plates 12. The forward ends of said rods 14' carry nuts 17' which are counter-sunk in said bar 22, while the rear ends of of said front bar in respect of said rear bar during operation of the bumper.

5. In a vehicle bumper including front and rear bumper bars, a central bar disposed between said first named two bars, a set of springs between said front bar and said central bar, another set of springs between said central bar and said rear bar, said first named set of springs being adapted to be compressed immediately at the impact at the front bar, the second named set of springs being adapted to be compressed only at the progression of the impact at said front bar, and a guiding means carried by the front bar and associated with said rear bar affording uniform shifting movement of said front bar and said rear bar during operation of the bumper, said guiding means including a plurality of plates passing through said central bar and said rear bar.

6. In a vehicle bumper including front and rear bumper bars, a central bar disposed between the first two named bars, said central bar being shorter than the other two bars, all of said bars being spaced on a horizontal plane, a spring interposed between the front bar and the central bar, a plurality of springs interposed between said front bar and said rear bar, and a plurality of springs interposed between said central bar and said rear bar, said first and second named springs being adapted for immediate compression at the impact at the front bar and said third named springs being adapted to compress only at the progression of the impact at said front bar.

7. In a vehicle bumper including front and rear bumper bars, a central bar disposed between the first two named bars, said central bar being shorter than the other two bars, all of said bars being spaced on a horizontal plane, a spring interposed between the front bar and the central bar, a plurality of springs interposed between said front bar and said rear bar, a plurality of springs interposed between said central bar and said rear bar, said first and second named springs being adapted for immediate compression at the impact at the front bar and said third named springs being adapted to compress only at the progression of the impact at said front bar, and guiding means cooperating with all of said bars for guiding the shifting movement of said front and central bars in respect of said rear bar.

8. In a vehicle bumper including front and rear bumper bars, a central bar disposed between the first two named bars, said central bar being shorter than the other two bars, all of said bars being spaced on a horizontal plane, a spring interposed between the front bar and the central bar, a plurality of springs interposed between said front bar and said rear bar, a plurality of springs interposed between said central bar and said rear bar, said first and second named springs being adapted for immediate compression at the impact at the front bar and said third named springs being adapted to compress only at the progression of the impact at said front bar, and guiding means cooperating with all of said bars for guiding the shifting movement of said front and central bars in respect of said rear bar, said means including a plurality of plates mounted upon said front bar and freely passing through said central and rear bars.

9. In a vehicle bumper including front and rear bumper bars, a central bar disposed between the first two named bars, all of said bars being spaced on a horizontal plane, a plurality of rods mounted upon said front bar, one of said rods passing through said central bar and through said rear bar and the remaining rods passing through said rear bar only, a spring mounted upon one of said rods and interposed between said front bar and said central bar, a plurality of springs mounted upon the remaining of said rods and interposed between said front bar and said rear bar, said rods being adapted to guide the rearward movement of the front bar in respect of said central bar and said rear bar, all of said named springs being adapted to compress during the impact at the front bar, another set of rods mounted in said central bar and freely passing through said rear bar, said latter rods being adapted to guide the rearward movement of the central bar in respect of said rear bar, and a plurality of springs mounted upon said last named rods and interposed between said central bar and said rear bar, said last named springs being adapted to compress at the progression of the impact at the front bar.

10. In a vehicle bumper including front and rear bumper bars, a central bar disposed between the first two named bars, all of said bars being spaced on a horizontal plane, a plurality of rods mounted upon said front bar, one of said rods passing through said central bar and through said rear bar and the remaining rods passing through said rear bar only, a spring mounted upon one of said rods and interposed between said front bar and said central bar, a plurality of springs mounted upon the remaining of said rods and interposed between said front bar and said rear bar, said rods being adapted to guide the rearward movement of the front bar in respect of said central bar and said rear bar, all of said named springs being adapted to compress during the impact at the front bar, another set of rods mounted in said central bar and freely passing through said rear bar, said latter rods being adapted to guide the rearward movement of the central bar in respect of said rear bar, a plurality of springs mounted upon said last named rods and interposed between said central bar and said rear bar, said last named springs being adapted to compress at the progression of the impact at the front bar, and means at the rear ends of all of said rods cooperating with said rear bar for limiting the forward movement of said front bar and said central bar and forward movement of the respective rods.

11. In a vehicle bumper including front and rear bumper bars, a central bar disposed between the first two named bars, all of said bars being spaced on a horizontal plane, a plurality of rods mounted upon said front bar, one of said rods passing through said central bar and through said rear bar and the remaining rods passing through said rear bar only, a spring mounted upon one of said rods and interposed between said front bar and said central bar, a plurality of springs mounted upon the remaining of said rods and interposed between said front bar and said rear bar, said rods being adapted to guide the rearward movement of the front bar in respect of said central bar and said rear bar, all of said named springs being adapted to compress during the impact at the front bar, another set of rods mounted in said central bar and freely passing through said rear bar, said latter rods being adapted to guide the rearward movement of the central bar in respect of said rear bar, a plurality of springs mounted upon said last named rods and interposed between said central bar and said rear bar, said last named springs being adapted to compress at the progression of the impact at the front bar, means at the rear ends of all of said rods cooperating with said rear bar for limiting the forward movement of said front bar and said central bar and forward movement of the respective rods, and a plurality of plates mounted upon said front bar and freely passing through said central bar and said rear bar for further guiding the shifting movement of the front bar and the central bar in respect of said rear bar.

In testimony whereof I affix my signature.

ALBERT SLOWIK.